United States Patent [19]
Yoshizawa

[11] Patent Number: 5,898,653
[45] Date of Patent: *Apr. 27, 1999

[54] OPTICAL HEAD UNIT FOR USE IN AN INFORMATION READ/WRITE APPARATUS

[75] Inventor: Takashi Yoshizawa, Yokohama, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,554

[22] Filed: Oct. 16, 1996

[30] Foreign Application Priority Data

Oct. 17, 1995 [JP] Japan .................................. 7-268326

[51] Int. Cl.$^6$ .................................................. G11B 7/095
[52] U.S. Cl. .................................. 369/44.27; 369/44.23; 369/44.22; 369/44.14
[58] Field of Search .................... 369/44.14, 44.27, 369/94, 112, 44.23, 44.17, 44.18, 44.19, 44.21, 44.22

[56] References Cited

U.S. PATENT DOCUMENTS 5,687,154 11/1997 Tsuchiya et al. ..................... 369/112
5,729,510 3/1998 Kasahara et al. .................... 369/44.14

FOREIGN PATENT DOCUMENTS

| | | |
|---|---|---|
| 0452953 | 10/1991 | European Pat. Off. . |
| 0470807 | 2/1992 | European Pat. Off. . |
| 0712122 | 5/1996 | European Pat. Off. . |
| 0727776 | 8/1996 | European Pat. Off. . |
| 7-85482 | 3/1995 | Japan . |
| 7-93798 | 4/1995 | Japan . |

Primary Examiner—Thang V. Tran
Attorney, Agent, or Firm—Pillsbury Madison & Sutro LLP

[57] ABSTRACT

In an optical head unit, a shift of a laser beam is corrected by a parallel flat plate such that the center of an intensity distribution of the laser beam incident on an objective lens with a greatest numerical aperture among at least two objective lenses coincides substantially with the optical axis of the objective lens with the greatest numerical aperture. The parallel flat plate is disposed in an optical path of the laser beam traveling toward the lens such that a predetermined angle is defined between a surface of the parallel flat plate and the laser beam. Thereby, optical disks with different recording densities can be reproduced with high precision, without influence of the shift of the beam.

23 Claims, 6 Drawing Sheets

OPTICAL HEAD UNIT FOR USE IN AN INFORMATION READ/WRITE APPARATUS

BACKGROUND OF THE INVENTION

1. Field of the Invention

This invention relates to an optical head unit for recording information data on an optical disk member, and a method of manufacturing the optical head unit.

2. Description of the Related Art

An optical head unit for use in recording information on an optical disk serving as a recording medium and reproducing information from the optical disk includes an actuator (movable unit) including an objective lens disposed near a recording surface of the optical disk, and a body unit (stationary unit) having a semiconductor laser element as a light source and a photodetector for converting a reflection laser beam received by the objective lens into an electric signal.

The objective lens is used to radiate onto the recording surface of the optical disk a laser beam of a predetermined wavelength produced by the semiconductor laser element and to receive the reflection laser beam reflected from the recording surface of the optical disk and to guide the reflection laser beam into the photodetector.

The photodetector photoelectrically converts the reflection laser beam received by the objective lens from the recording surface of the optical disk and produces an electric signal corresponding to the light intensity of the reflection laser beam.

Various methods for increasing the recording density have been proposed. For example, the diameter of a laser beam radiated on the recording surface of the optical disk by means of the optical head unit is reduced, i.e. the size of a recording pit is reduced; the interval of recording pits on the track on the optical disk is reduced; or the sensitivity of the photodetector for sensing the reflection laser beam from the optical disk is enhanced.

More than ten years have passed since the compact disks for musical use were developed. Moreover, various kinds of optical disks, typically CD-ROMs for personal computers or photo-CDs, have been developed for business use or household use.

The optical disks are mass-produced according to the standards stipulated in the industrial world. The standards themselves, however, have been altered to meet the demands of the times, for example, an increase in recording capacity or in number of functions (e.g. not only reproducing but also recording and/or erasing is performed). In addition, a number of new standards have been proposed.

As a result, about ten kinds of optical disks have been marketed.

It is practically not possible to prepare all types of drives matching with various optical disks, because of economic reasons, difficulty in handling the drives, or limited space for installation.

Under the circumstances, there is a demand for a method and an apparatus for reproducing information from different types of optical disks by means of a single drive. Needless to say, there is a similar demand for a method and an apparatus for recording and/or erasing information by means of a single drive.

According to one proposal, in order to provide different light spots of a laser beam necessary for reproducing or recording/erasing information on two or more kinds of optical disks with different recording densities, the actuator is provided with a necessary number of objective lenses with different numerical apertures and the optical objective lens is selected according to the kind of the optical disk.

However, in the optical head unit in which the objective lenses with different numerical apertures are switched, the tracking is controlled in the state in which the objective lens is shifted in the tracking direction (i.e. radial direction of the optical disk) relative to the parallel beam incident on the objective lens. In principle, while the apparatus is being operated, a beam shift (displacement between the center of intensity of the parallel beam and the center of optical axis of the objective lens) occurs more or less at all times.

According to another proposed method, when information recorded on an outer peripheral area of an optical disk needs to be reproduced while information on an inner peripheral area is being reproduced, the optical head unit is shifted in the radial direction of the optical disk to access a desired track in the state in which and the objective lens is shifted in the tracking direction by a predetermined amount.

In this method, the objective lens is restored at last to the shift-free state from the state in which it is shifted in the tracking direction. During the access, a tracking error signal having a predetermined quality level must be obtained to exactly seek a target track, though the objective lens is in the shifted state.

It is well known, however, that to shift a beam results in an offset of the tracking error signal or a decrease in signal amplitude. Consequently, the quality of the tracking error signal is degraded. In fact, there is a problem in that a beam is shifted due to machining precision of individual parts of the optical head unit and/or attachment precision of the parts.

To shift the beam, therefore, causes an offset in a focus error signal or a tracking error signal, or degrades C/N in reading recorded information signals.

In addition, the degree of shift of the beam differs among switchable objective lenses.

As a result, although the objective lenses with higher numerical apertures are used for optical disks on which information is recorded at high density, the recording/reproducing performance of the optical head unit is degraded.

SUMMARY OF THE INVENTION

An object of the present invention is to provide an optical head unit for reproducing information from optical disks with different recording densities.

Another object of the invention is to provide an optical head unit capable of reproducing optical disks with different recording densities and reproducing the disk having a highest recording density with a highest precision.

In order to achieve the above objects, there is provided an optical head unit for use in an information read/write apparatus, comprising:

means for supplying a laser beam to a recording medium;
at least two lenses having different numerical apertures;
means for moving the lenses in a radial direction of the recording medium and in a direction perpendicular to a surface of the recording medium;
means for switching one of the lenses;
means for converting a reflection laser beam from the recording medium to an electric signal; and
shift means for making the center of an intensity distribution of the laser beam incident on the switched lens switched by the switching means with a greatest numerical aperture, among the lenses, coincide substantially with the center of the aperture of the lens with the greatest numerical aperture.

According to this invention, there is also provided an optical head unit for use in an information read/write apparatus, comprising:

a light source for emitting light with a predetermined wavelength;

separating means for guiding the light from the light source towards a recording medium, and separating light reflected by the recording medium from the light guided toward the recording medium;

a first lens having a first numerical aperture and disposed to be shiftable to an optical path of the light guided through the separating means;

a second lens having a second numerical aperture different from the first numerical aperture and disposed to be shiftable to the optical path of the light guided through the separating means;

lens holding means for holding said first and second lenses to be shiftable to the optical path of the light;

lens switching means for moving the lens holding means to a predetermined position, thereby selectively shifting one of the first and second lenses to the optical path of the light; and optical path altering means, disposed at one of a position between said light source and said separating means and a position between said separating means and said lens holding means, for shifting by a predetermined amount the light guided from the light source towards the lens, which has been shifted to the optical path of the light by means of the lens switching means, with respect to the optical axis of the lens shifted to the optical path of the light by means of the lens switching means.

According to this invention, there is also provided a method for forming an optical head unit, comprising the steps of:

disposing at least two lenses having different numerical apertures so as to be movable in a radial direction of a recording medium and in a direction perpendicular to a surface of the recording medium and to be selectably shiftable to an optical path of light traveling toward the recording medium;

disposing a parallel flat plate in the optical path of a laser beam traveling toward the lens shifted to the optical path; and disposing the parallel flat plate at a predetermined angle such that the center of the aperture of the lens with a greatest numerical aperture among said lenses coincide substantially with the center of an intensity distribution of the laser beam incident on the lens with the greatest numerical aperture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

An embodiment of the present invention will now be described with reference to the accompanying drawings.

Figure 1:
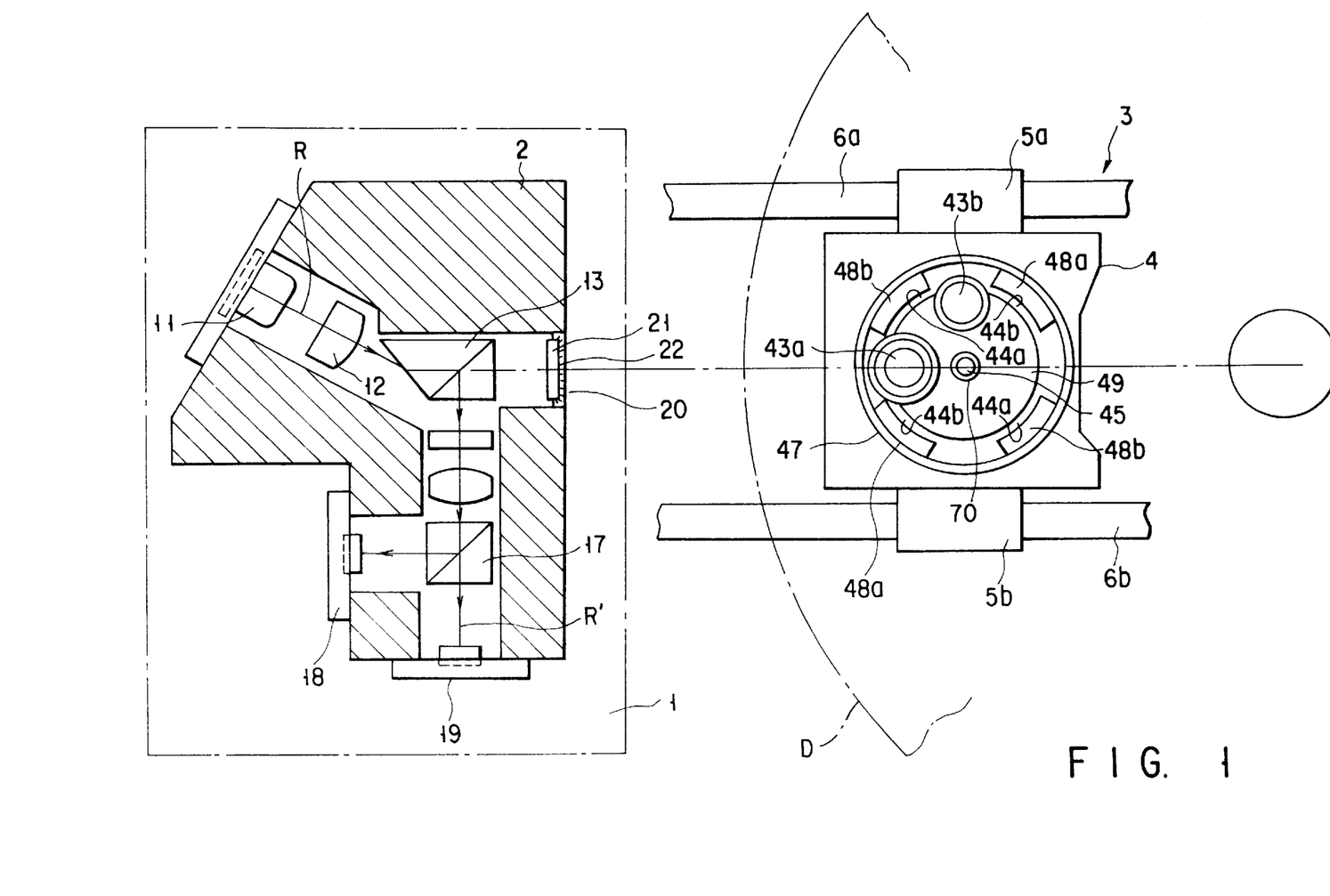
FIG. 1 is a plan view of an entire optical head unit according to an embodiment of the invention.
Figure 2:
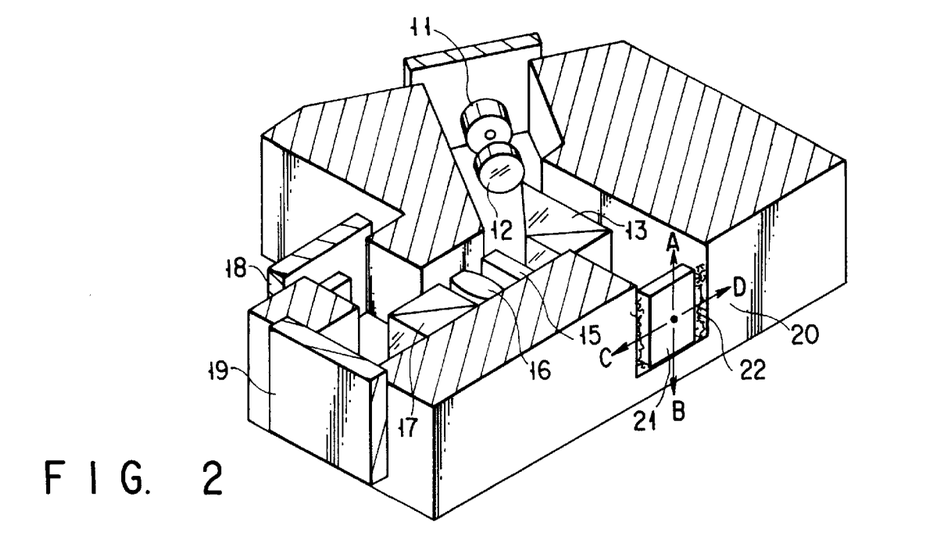
FIG. 2 is a perspective view of an optical head unit shown in FIG. 1.
Figure 3:
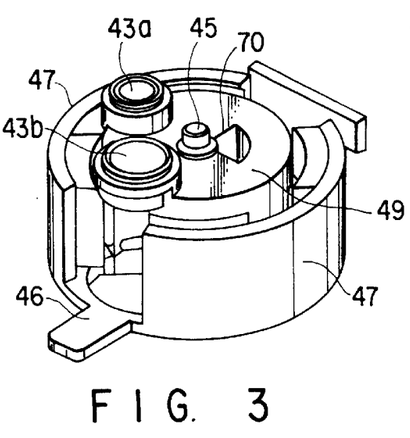
FIG. 3 is a perspective view of an actuator unit of the optical head unit shown in FIG. 1.
Figure 4:
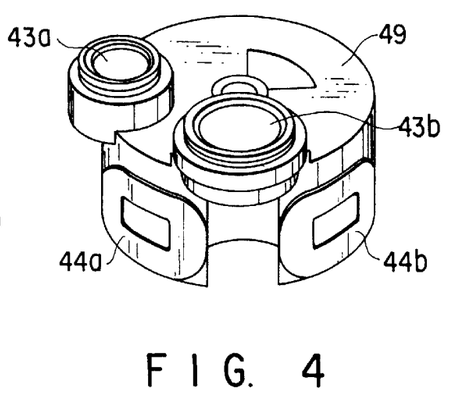
FIG. 4 is a perspective view of a lens holder built in the actuator unit of the optical head unit shown in FIG. 1.
Figure 5:
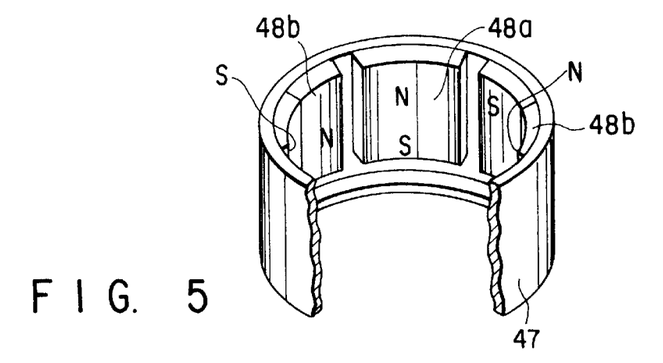
FIG. 5 is a cross-sectional view showing a magnetic circuit inside the actuator unit of the optical head unit shown in FIG. 1.

FIGS. 1 to 5 show an optical head unit according to the embodiment of the invention. FIG. 1 is a plan view of the entire unit, FIG. 2 is a perspective view of a body unit of the optical head unit, FIG. 3 is a perspective view of an actuator unit, FIG. 4 is a perspective view of a lens holder built in the actuator unit, and FIG. 5 is a cross-sectional view showing an example of a magnetic circuit inside the actuator unit.

As is shown in FIG. 1, the optical head unit 1 includes a body unit (stationary unit) 2 disposed substantially in parallel to a recording surface (not shown) of an optical disk D, and an actuator unit (movable unit) 3 disposed between the body unit 2 and a spindle motor (not shown) for rotating the optical disk D at a predetermined speed such that a laser beam from the body unit 2 can be radiated onto the recording surface (not shown) of the optical disk D.

The actuator unit 3 has a carriage 4.

The carriage 4 can be moved in the radial direction of the optical disk D by means of a pair of radial drive coils 5a and 5b, which constitute part of a linear motor (not shown) formed integral to the carriage 4, and a pair of guide rails 6a and 6b.

The body unit 2 has a semiconductor laser 11 for producing a laser beam of a predetermined wavelength; a collimator lens 12 for collimating the divergent laser beam emitted from the semiconductor laser 11; an elliptical correction prism 13 for correcting the aspect ratio of the laser beam collimated by the collimator lens 12; a first beam splitter 14, assembled with the elliptical correction prism 13, for passing the laser beam corrected by the elliptical correction prism 13 to have a substantially circular cross section towards the actuator unit 3 or optical disk D, and for separating a reflection laser beam reflected by the recording surface (not shown) of optical disk D from the laser beam traveling towards the optical disk D; a ½ wavelength plate 15 for compensating the direction of polarization of a polarizing surface of the reflection laser beam separated by the first beam splitter 14; a converging lens 16 providing predetermined focusing characteristics and convergence characteristics to the reflection laser beam emanating from the ½ wavelength plate 15; a second beam splitter 17 for splitting the reflection laser beam emanating from the converging lens 16 into two beams; first and second photodetectors 18 and 19 for photoelectrically converting the laser beams split by the second beam splitter 17 into electric signals corresponding to the light intensities of the respective laser beams; and a shift correction plate (parallel flat plate) 21 for correcting an error between the optical axis of the first beam splitter 14 and an objective lens (described later) of the actuator unit 3.

The actuator unit 3 includes a raised mirror 41 for guiding the laser beam emitted from the semiconductor laser 11 through the first beam splitter 14 of body unit 2 into the objective lens (described later); a lens holder 42 for holding first and second objective lenses (described later); the first and second objective lenses 43a and 43b for converging the laser beam guided by the raised mirror 41 onto the recording surface (not shown) of the optical the disk with a predetermined beam spot; two pairs of coils 44a and 44b for providing a torque for switching the first and second objective lenses to set one of them in the optical path of the laser beam guided by the raised mirror 41; a rotary bearing 49 for enabling switching of the first and second objective lenses; an actuator base 46 for rotatably holding the lens holder 42 by means of a rotary shaft 45; and a yoke 47 and two pairs of magnets 48a and 48b for providing magnetic fields in predetermined directions to the two pairs of coils 44a and 44b.

A description will now be given of how the laser beam travels within the optical head unit 1.

The laser beam emitted from the semiconductor laser 11 is converted to a parallel beam by the collimator lens 12 and passed through the first beam splitter 14.

The laser beam, which has been passed through the first beam splitter 14 and shift correction plate 21 and emitted out of the body unit 2, is deflected by the raised mirror 41 by 90° and made incident on a pre-selected one of the first objective lens 43a and second objective lens 43b. At this time, it is desirable that the center of intensity of the laser beam coincide substantially with the center of the objective lens 43a or 43b.

The laser beam incident on the pre-selected objective lens 43a or 43b is guided to the recording surface (not shown) of the optical disk D through the pre-selected objective lens and converged on the recording surface with a predetermined beam spot size.

Then, the laser beam is reflected by the recording surface of optical disk D and returned to the first beam splitter 14 through the same objective lens 43a or 43b, raised mirror 41 and shift correction plate 21.

The reflection laser beam, which has reached the first beam splitter 14, is then reflected by the first beam splitter 14 and passed through the ½ wavelength plate 15 and converging lens 16. The beam converged by the converging lens 16 is split into two beams by the second beam splitter 17. One of them is focused on the detection surface of the first photodetector 18, and the other on the detection surface of the second photodetector 19.

The light incident on a predetermined photosensitive portion of the detection surface of the photodetector 18, 19 is photoelectrically converted to obtain an information signal, a focus error signal and a tracking error signal.

On the basis of the tracking error signal, an error in the radial direction between the beam spot formed by the objective lens 43a or 43b and the center of a given track on the optical disk D is corrected.

On the basis of the focus error signal, the distance between the recording surface of optical disk D and the objective lens is adjusted to correct the position of the beam spot focused by the objective lens 43a or 43b.

The structure of the actuator unit 3 will now be described in detail.

The first objective lens 43a and second objective lens 43b having different numerical apertures are attached to the lens holder 42. The numerical aperture of the first objective lens 43a is greater than that of the second objective lens 43b.

The rotary bearing 49 of lens holder 42 is engaged with the rotary shaft 45. The rotary shaft 45 is formed on the actuator base 46 so that the shaft 45 can support the lens holder 42. The lens holder 42 is supported so as to be rotatable about the rotary shaft 45 and movable along the axis of the rotary shaft 45.

A yoke 47 is formed on the actuator base 46 so as to extend in the circumferential direction of the rotary shaft 45. The magnets 48a and magnets 48b are disposed at predetermined positions on the yoke 47.

As is shown in FIG. 5, each of the magnets 48a is divided by a plane perpendicular to the optical axis of the objective lens and the divided portions are magnetized to have an N pole and an S pole respectively. On the other hand, each of the magnets 48b, as shown in FIG. 5, is divided by a plane parallel to the optical axis of the objective lens and the divided portions are magnetized to have an N pole and an S pole respectively.

When the first objective lens 43a is selected, an electromagnetic interaction is caused by the current supplied to the first coil 44a and the magnetic field of the magnets 48a, so that a driving force is produced to shift the lens holder 42 in the focusing direction. When the second objective lens 43b is selected, an electromagnetic interaction is caused by the current supplied to the second coil 44b and the magnetic field of the magnets 48b, so that a driving force is produced to shift the lens holder 42 in the focusing direction.

When the first objective lens 43a is selected, an electromagnetic interaction is caused by the magnetic field of the magnets 48b and the current supplied to the second coil 44b, so that a torque is produced to rotate the lens holder 42 about its own axis. When the second objective lens 43b is selected, an electromagnetic interaction is caused by the magnetic field of the magnets 48a and the current supplied to the first coil 44a, so that a torque is produced to rotate the lens holder 42 about its own axis.

By the torque thus produced, the tracking control is carried out and the lens holder 42 is rotated, whereby the first and second objective lenses 43a and 43b are switched so that one of them is set in the optical path of the laser beam deflected by the raised mirror 41. When the first objective lens 43a is selected, the first coil 44a is connected to a focus control circuit. When the second objective lens 43b is selected, the first coil 44a is connected to a tracking control circuit. On the other hand, when the first objective lens 43a is selected, the second coil 44b is connected to the tracking circuit. When the second objective lens 43b is selected, the second coil 44b is connected to the focus control circuit.

A switching element used for the above switching is located, at least, on the upstream side of a power amplifier (not shown), thereby to prevent circuit breakage at the time of switching.

The behavior of the lens holder 42 just after the switching operation will now be described.

Since magnetic material is contained in the lens holder 42, a magnetic attraction force acts on the lens holder 42 in a magnetic field before the switching operation. Thus, the lens holder 42 is set in a neutral position in the focusing direction and in a neutral position in the tracking direction.

If a command for the switching of the lens is issued, the position of the first objective lens 43a is made to coincide with the new neutral position of the second objective lens 43b.

When the two objective lenses have been switched, the lens holder 42 is substantially stabilized and finally set in a predetermined position.

Thus, a plurality of optical disks with different recording densities can be reproduced or recorded/erased by a single drive.

The principle of shift correction and a specific method of adjusting will now be described.

A parallel flat plate 21 of a transparent material such as glass or plastics capable of passing specified light is disposed at an angle different from 90° to the optical axis of a parallel beam. In this case, it is known that the angle of an incoming light beam is equal to that of an outgoing light beam, and the incoming light beam is shifted in parallel and emitted from the parallel flat plate.

The amount of shift, d, is given by $$d = t \cdot \sin \phi \{1 - \cos \phi'/(n \cdot \cos \phi')\} \quad (1)$$

where t: the thickness of the parallel flat plate,

φ: the incident angle of the optical axis of the beam incident on the parallel flat plate, φ': the refraction angle of the optical axis of the beam incident on the parallel flat plate, and n: the refractive index of the material of the parallel flat plate.

Figures 6, 7:
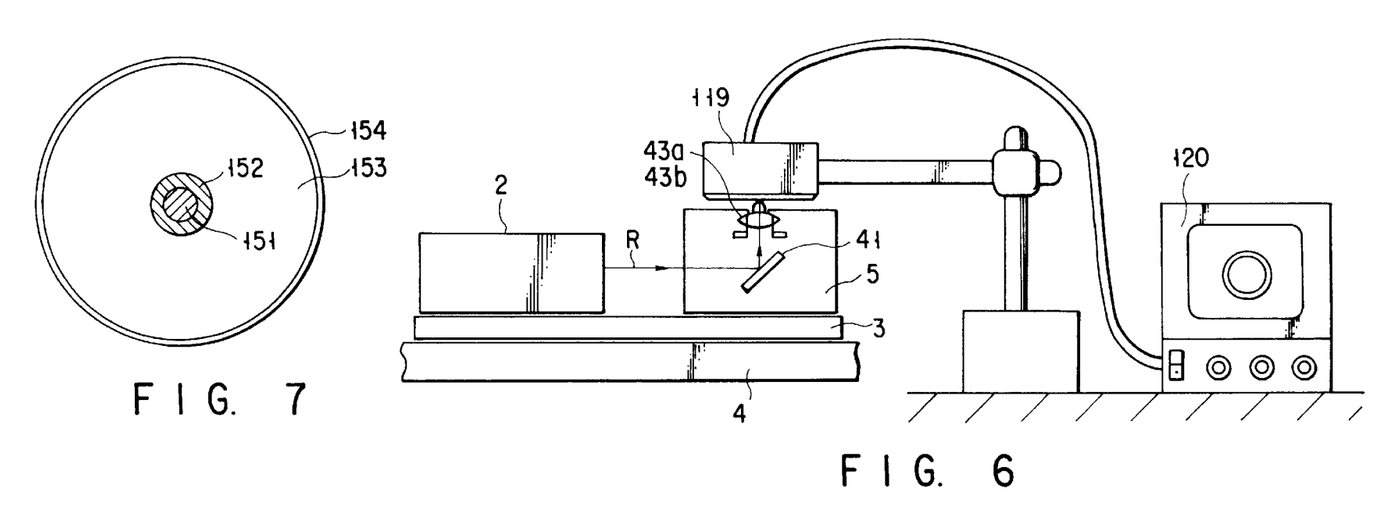
FIG. 6 schematically shows a monitor device for use in adjusting the rotation and inclination of a parallel flat plate applied to the optical head unit shown in FIG. 1.
FIG. 7 is a schematic view showing an example of an output screen of the monitor device shown in FIG. 6.

Based on this principle, a beam pattern emitted from the objective lens is received by a CCD camera 119 and displayed on a monitor CRT 120, as shown in FIG. 6.

FIG. 7 schematically shows the relationship between the center of luminance distribution of the beam just after emanating from the objective lens and the outside diameter of the objective lens.

In FIG. 7, reference numeral 154 denotes an image corresponding to the outside diameter of the objective lens, e.g. 4.5 mm in this embodiment.

When the center of luminance distribution is within a region 151, there is no practical problem even if the emitted beam is shifted. Accordingly, shift correction is unnecessary.

A region 152 (an annular region defined by eliminating the region 151 from a circle with a radius about twice as great as the radius of the region 151) indicates a region where shift correction is achievable with use of a shift correction mechanism (described later).

Supposing that the center of luminance distribution is present within the region 152, the state of the center of luminance distribution before and after shift correction will now be described with reference FIGS. 8A to 8C, and the state of inclination of the parallel flat plate 21 with reference to FIGS. 9A to 9D.

At first, suppose that the center of luminance distribution is displaced to the right side.

Figures 9A, 9B, 9C, 9D, 10:
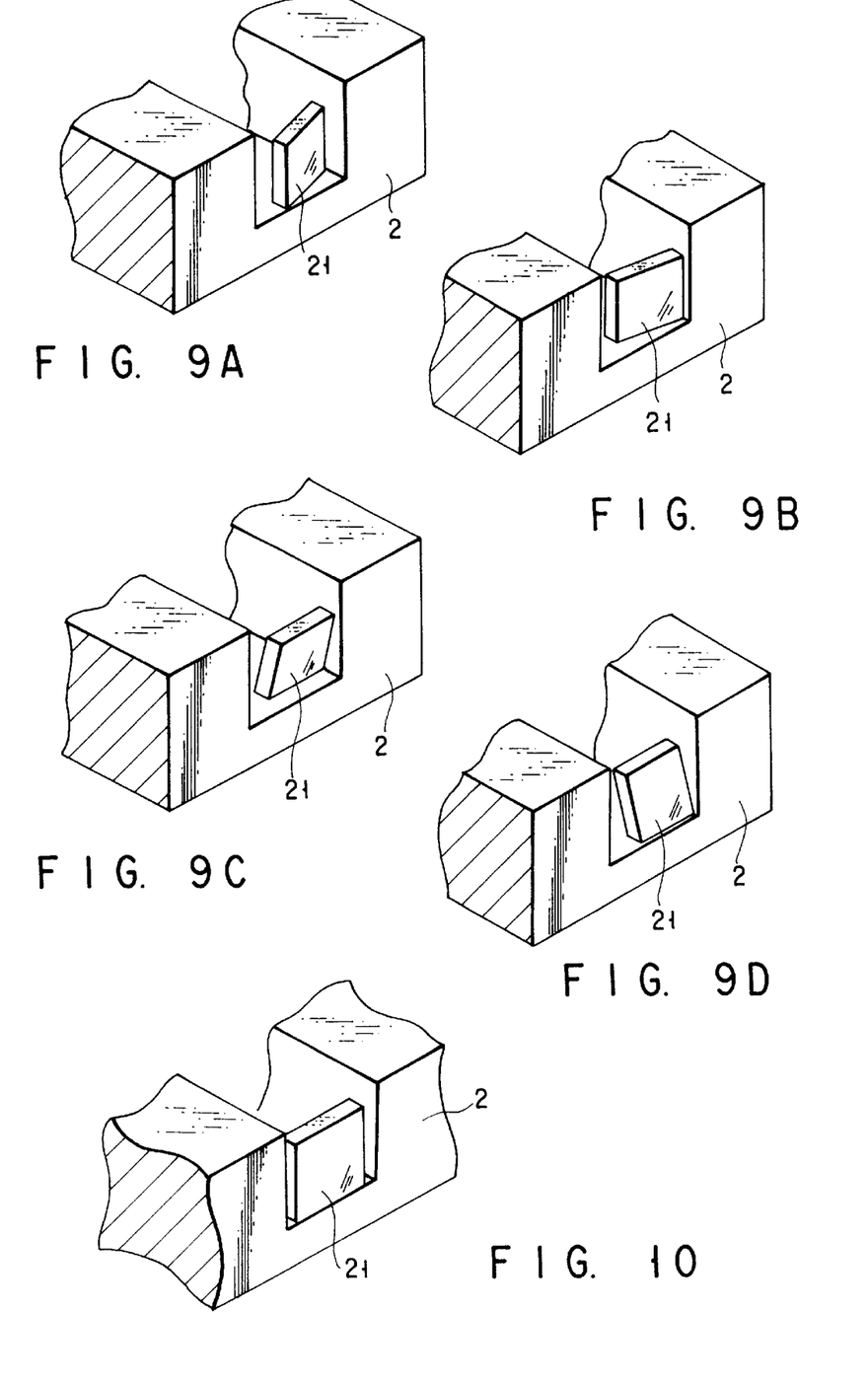
FIGS. 9A to 9D are schematic views showing examples of rotation and inclination of the parallel flat plate applied to the optical head unit shown in FIG. 1.
FIG. 10 shows an example of the parallel flat plate free from rotation or inclination, which flat plate is applied to the optical head unit shown in FIG. 1.

Points P1, P2 and P3 denote the positions of the center of luminance distribution before shift correction. In this case, the center of luminance distribution must be shifted to the left side. Thus, the parallel flat plate 21 is rotated, as shown in FIG. 9A. The amount of correction actually obtained by equation (1) is about 0.3 mm, which corresponds to about ¾ of the region 152. As a result, points P1, P2 and P3 are shifted to P1', P2' and P3'. Point P1 indicates a greatest shift amount in a possible range, and point P3 indicates a smallest shift amount.

The center of luminance distribution is similarly corrected when it is shifted to the upper side or lower side. When the center of luminance distribution is shifted to the left side, the parallel flat plate 21 is situated, as shown in FIG. 9B. When the center of luminance distribution is shifted to the upper side, the parallel flat plate 21 is situated, as shown in FIG. 9C. When the center of luminance distribution is shifted to the lower side, the parallel flat plate 21 is situated, as shown in FIG. 9D.

Figure 8A:
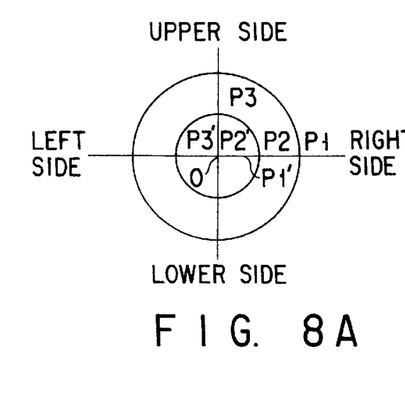
FIGS. 8A to 8C are schematic views showing examples of output images on the monitor device shown in FIG. 6.
Figure 8B:
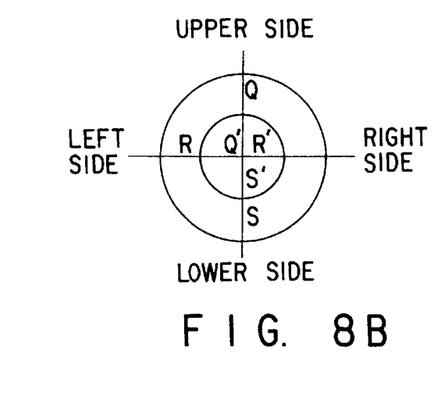

FIG. 8B shows the state of the center of luminance distribution before and after the shift correction in the above case. In the context of the description, the "upper side" is an arrow A side of the sheet of FIG. 2, the "lower side" is an arrow B side of the sheet of FIG. 2, the "right side" is an arrow C side on the sheet of FIG. 2, and the "left side" is an arrow D side on the sheet of FIG. 2. If the direction of displacement of the center is not one of the right side, left side, upper side and lower side, for example, if the displacement occurs in a direction, as shown in FIG. 8C, the direction of displacement on the right side and the upper side of the sheet of FIG. 8C. When the displacement of the center occurs, as shown in FIG. 8C, the parallel flat plate 21 is, needless to say, situated in a middle position between the direction of correction for right-side displacement (FIG. 9A) and the direction of correction for upperside displacement (FIG. 9C).

The structure of the shift correction mechanism 20 will now be described with reference to FIG. 2.

As is shown in FIG. 2, the shift correction mechanism 20 comprises the parallel flat plate 21 formed of, e.g. optical glass BK-7 and an elastic adhesive 22. The parallel flat plate 21 has a height of 8 mm, a width of 6 mm and a thickness of 2 mm. Specifically, the elastic adhesive 22 may be EP-001 (Cemedain Kabushiki Kaisha) or BOND MOS7 (KONISHI Kabushiki Kaisha).

A specific method for shift correction will now be described. As is shown in FIG. 6, the CCD camera 119 is made to face the objective lens 43a or 43b. The CCD camera 119 images the emission light from the objective lens 43a or 43b, and the obtained image is displayed on the monitor CRT 120. Thus, the luminance distribution of the emission light is observed.

A method of adjusting the rotation and inclination of the parallel flat plate 21 will now be described with reference to FIG. 11.

Figure 11:
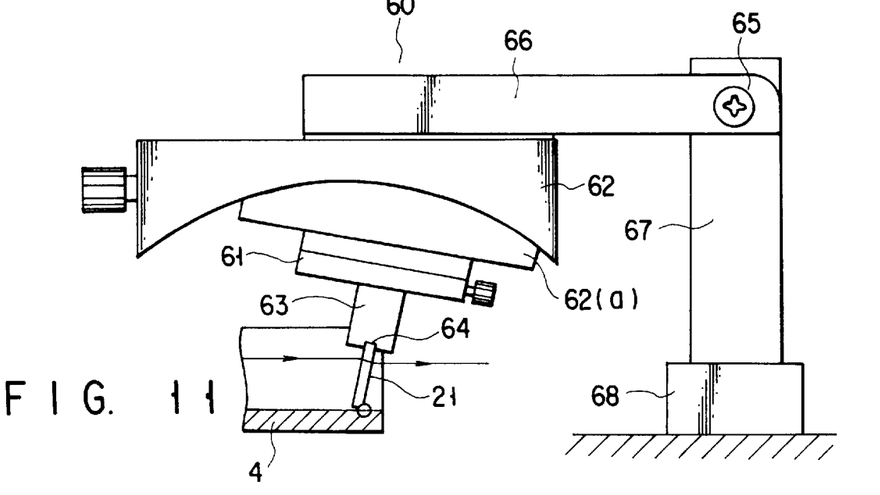
FIG. 11 shows an example of an adjusting device for use in adjusting the rotation and inclination of the parallel flat plate applied to the optical head unit shown in FIG. 1.

An adjusting device 60 has a mount base 68, as shown in FIG. 11.

A pole 67 is erected on the mount base 68, and an arm 66 is attached to an upper end portion of the pole 67 by means of a rotational portion 65. The arm 66 is rotatable about the rotational portion 65.

A gonio-stage 62 having an inclined surface 62a provided with a rotational stage 61 is attached to a distal end portion of the arm 66.

A hold block 63 is attached to a rotational surface 61a of rotational stage 61.

With the arm 66 raised, the parallel flat plate 21 is situated at a predetermined location on the body unit 2, e.g. between the first beam splitter 14 and the raised mirror 41 of actuator unit 3, as shown in FIG. 1. Then, the parallel flat plate 21 is lowered until the lower end portion thereof comes in contact with the bottom surface of the body unit 2.

The gonio-stage 62 is moved in this state, and the parallel flat plate 21 is inclined so that the beam is shifted upward or downward. If the rotational stage 61 is rotated, the parallel flat plate 21 is rotated and the beam is shifted to the right side or left side.

While the luminance distribution pattern of the emission light from the objective lens, which is displayed on the monitor CRT 120, is being viewed, the gonio-stage 62 and rotational stage 61 are adjusted by a predetermined amount so that the center of luminance distribution falls within the region 151.

If shift correction is not needed, the parallel flat plate may be situated at about 90° to the optical axis of the beam, as shown in FIG. 10.

After the above process is completed, the elastic adhesive 22, e.g BOND MOS7, is applied to a gap between the parallel flat plate 21 and the bottom surface of the body unit 2. The adhesive 22 is solidified about 30 minutes after the application. Then, the parallel flat plate 21 is released from the adjusting jig.

A second embodiment of the invention will now be described.

Figure 12A:
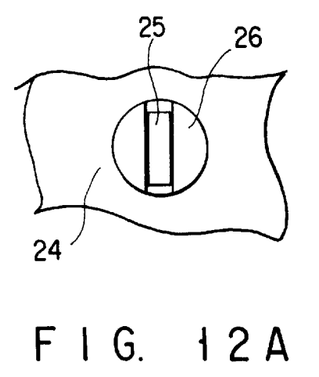
FIGS. 12A to 12C are three-side views showing another example of the parallel flat plate applied to the optical head unit shown in FIG. 1.
Figure 12B:
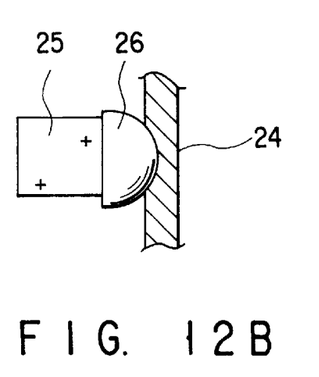
Figure 12C:
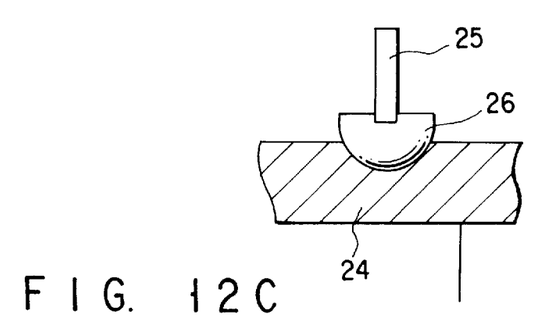
Figure 13A:
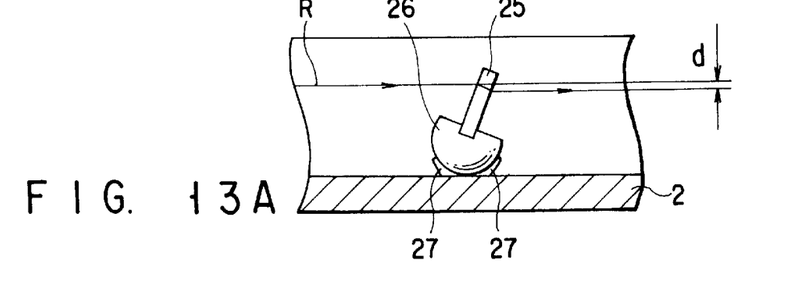
FIGS. 13A to 13D schematically show the relationship between input light and output light when the parallel flat plate shown in FIGS. 12A to 12C is used.
Figure 13B:
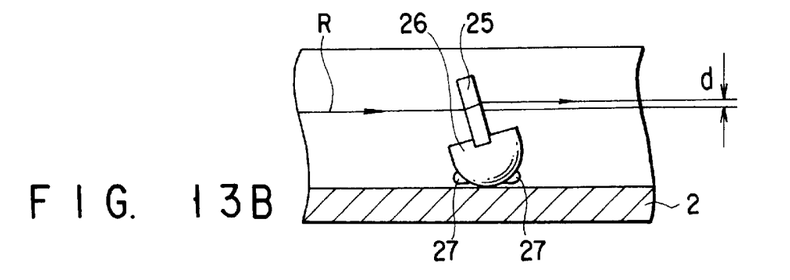
Figure 13C:
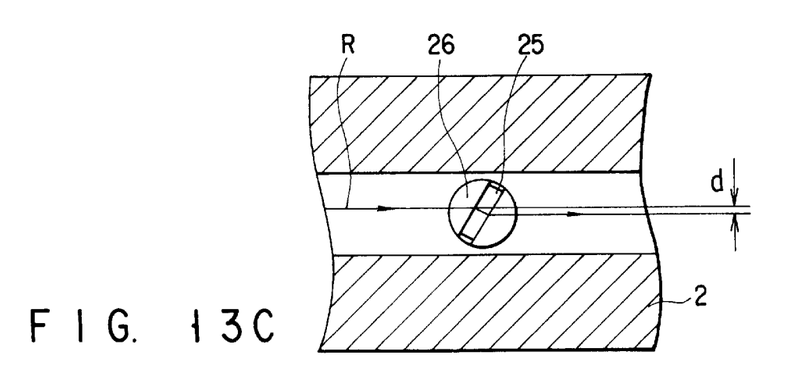
Figure 13D:
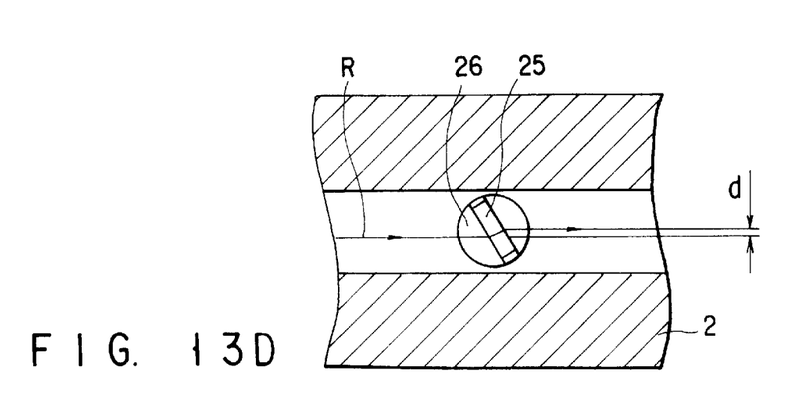

As is shown in FIG. 12, a shift correction unit 24 comprises a shift correction plate 25 and a holder 26 which are coupled to each other. The shift correction plate 25, which is a parallel flat plate of optical glass (BK-7), has, e.g. a thickness of 2 mm, a height of 10 mm and a width of 8 mm. The holder 26 is formed of, e.g. aluminum material and has a substantially hemispherical surface (the radius of curvature being 6 mm in this embodiment). More specifically, the holder 26 does not have a perfect hemispherical shape, but a largest-diameter-portion of the hemispherical body is provided with a cylindrical portion (height=2 mm) having the same diameter.

Like the first embodiment, while the amount and direction of beam shift are being confirmed, the shift correction unit 24 is put in a predetermined optical path.

An upper portion of the shift correction unit 24 is fitted on an adjusting jig (not shown). The shift correction plate 25 is rotated or inclined, or rotated and inclined, by the adjusting jig, thereby to correct a beam shift. In this case, as shown in FIGS. 13A and 13C and FIGS. 13B and 13D, the angle of an incident beam on the shift correction plate 25 is equal to that of an emission beam from the shift correction plate 25. That is, the incident beam is shifted in parallel and emanates from the shift correction plate 25.

Figure 8C:
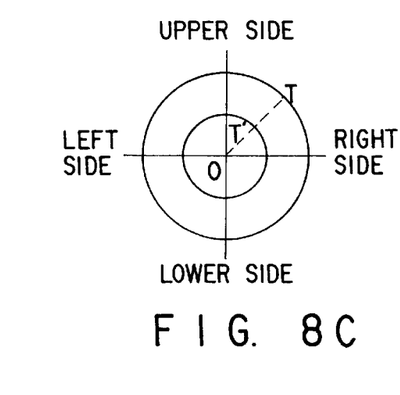

The direction of inclination of shift correction plate 25 is adjusted, like the first embodiment, depending on which of FIGS. 8A to 8C corresponds to the luminance distribution pattern of the beam emitted from the objective lens, which is displayed on the monitor device shown in FIG. 6.

Since the bottom portion of the shift correction unit 24 is rounded, the shift correction unit 24 can be smoothly rotated or inclined by a desired degree by means of the adjusting jig.

After the adjustment is completed, a photo-setting adhesive 27, e.g. 3033 (THREE-BOND Corp.) is applied to a boundary between the bottom portion of the holder 26 and the bottom surface of body unit 2. the adhesive 27 is set by radiation of specified light. The setting time is about 30 sec. and the process is advantageously simplified.

The material of the parallel flat plate 21 and shift correction plate 25 is not limited to optical glass such as BK-7 or SF-11. The plates 21 and 25 may be formed of a transparent resin material such as polycarbonate resin, acrylic resin or amorphous polyolefin resin.

When the above-described shift correction method is applied to the optical head unit having the first and second objective lenses or more objective lenses, one of the objective lenses must be selected.

In the present invention, the objective lens with the greatest numerical aperture is selected.

Specifically, the objective lens with the greatest numerical aperture is applicable to the optical disk with highest recording density. Such an objective lens, therefore, must be positioned exactly so as to cause no offset component in a reproduced signal. Thus, a stable reproduced signal can be obtained by performing the shift correction on the objective lens with the greatest numerical aperture, which is susceptible to offset component. When the other objective lenses with lower numerical apertures are used in the optical head unit in which the objective lens with the greatest numerical aperture has been subjected to the shift correction, a shift component is not necessarily completely corrected. However, since the numerical aperture is relatively low, the influence of the shift component is not serious. Therefore, a greater advantage is obtained by carrying out the shift correction on the objective lens with the greatest numerical aperture.

As has been described above, according to the present invention, the beam shift is corrected by the shift correction mechanism including the parallel flat plate so that the center of intensity distribution of the laser beam incident on the objective lens with the greatest numerical aperture, among a plurality of objective lenses, may coincide substantially with the optical axis of the objective lens. Therefore, information from optical disks with different recording densities can be reproduced with high precision, without the influence of beam shift.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical head unit for use in an information read/write apparatus, comprising:
   means for supplying a laser beam to a recording medium;
   at least two lenses having different numerical apertures;
   lens switching and moving means including two pairs of magnets and two pairs of coils and carrying said at least two lenses, for selectively switching said at least two lenses into and out of an optical path of said laser beam and adjusting the tracking of a selected one of said at least two lenses which is removably located in the optical path of said laser beam using a magnetic field generated by one pair of said two pairs of magnets, and for adjusting the focusing of said selected one of the lenses using a magnetic field generated by the other pair of said two pairs of magnets;

means for converting a reflection laser beam from the recording medium to an electric signal; and shift means for making a center of an intensity distribution of the laser beam incident on said selected one of said at least two lenses coincide substantially with a center of an aperture of the lens of said at least two lenses with the greatest numerical aperture, wherein, when a first one of said at least two lenses is in said optical path, control of said tracking is performed using a first pair of said two pairs of coils and control of said focusing is performed using a second pair of said two pairs of coils, and, when a second one of said at least two lenses is in said optical path, control of said tracking is performed using said second pair of said two pairs of coils and control of said focusing is performed using said first pair of said two pairs of coils.

2. An optical head unit according to claim 1, wherein said shift means includes a shift amount adjusting means capable of adjusting a shift amount of the laser beam.

3. An optical head unit according to claim 2, wherein said shift means is a parallel flat plate situated in said optical path of the laser beam traveling toward the selected one of said at lest two lenses such that a predetermined angle is defined between a surface of the parallel flat plate and the laser beam.

4. An optical head unit according to claim 3, wherein said parallel flat plate is fixed by an elastic adhesive.

5. An optical head unit according to claim 2, wherein said shift amount adjusting means includes an elastic adhesive.

6. An optical head unit according to claim 5, wherein said shift amount adjusting means includes a parallel flat plate held on a holder having a curved surface, and said shift means is moved in a predetermined direction by a necessary amount with said curved surface of the holder used as a center of the movement, such that said movement of the shift means is at least one of rotational movement and inclining movement and a predetermined angle is defined between a surface of the parallel flat plate and the laser beam in the optical path of the laser beam traveling toward the selected one of said at least two lenses.

7. An optical head unit according to claim 2, wherein said shift amount adjusting means includes a parallel flat plate held on a holder having a curved surface, and said shift means is moved in a predetermined direction by a necessary amount with said curved surface of the holder used as a center of the movement, such that said movement of the shift means is at least one of rotational movement and inclining movement and a predetermined angle is defined between a surface of the parallel flat plate and the laser beam in the optical path of the laser beam traveling toward the selected one of said at least two lenses.

8. An optical head unit according to claim 1, wherein the magnetic field generated by said other pair is adapted to move said at least two lenses in a direction perpendicular to a plane in which said at least two lenses are arranged.

9. An optical head unit according to claim 1, wherein the magnetic field generated by said one pair of said two pairs of magnets is adapted to rotate said at least two lenses about an axis perpendicular to a plane in which said at least two lenses are arranged.

10. An optical head unit according to claim 1, wherein said two pairs of coils are arranged such that changes in direction of current flow through said two pairs of coils cause changes in direction of rotation of said at least two lenses and changes in direction of translation of said at least two lenses along an axis of said rotation.

11. An optical head unit according to claim 10, wherein the magnetic field generated by said other pair is adapted to move said at least two lenses in a direction perpendicular to a plane in which said at least two lenses are arranged.

12. An optical head unit according to claim 10, wherein the magnetic field generated by said one pair of said two pairs of magnets is adapted to rotate said at least two lenses about an axis perpendicular to a plane in which said at least two lenses are arranged.

13. An optical head unit according to claim 12, wherein said at least two lenses are arranged at right angles, as viewed in a direction perpendicular to said plane in which said at least two lenses are arranged.

14. An optical head unit according to claim 1, wherein said at least two lenses are coplanar.

15. An optical head unit according to claim 1, said at least two lenses being movable about a central axis parallel to the optical axes of said at least two lenses, and said two pairs of coils being disposed about said central axis such that said first pair of said two pairs of coils face each other and said second pair of said two pairs of coils face each other.

16. An optical head unit for use in an information read/write apparatus, comprising:

a light source for emitting light with a predetermined wavelength;

separating means for guiding the light from the light source towards a recording medium, and separating light reflected by the recording medium from the light guided toward the recording medium;

a first lens having a first numerical aperture and disposed to be shiftable to an optical path of the light guided through the separating means;

a second lens having a second numerical aperture different from the first numerical aperture and disposed to be shiftable to the optical path of the light guided through the separating means;

lens holding means for holding said first and second lenses to be shiftable to the optical path of the light;

lens switching means including two pairs of magnets and two pairs of coils and carrying said first and second lenses, for selectively switching said first and second lenses into and out of an optical path of said light and adjusting the tracking of a selected one of said first and second lenses which is removably located in the optical path of said light using a magnetic field generated by one pair of said two pairs of magnets, and for adjusting the focusing of said selected one of the lenses using a magnetic field generated by the other pair of said two pairs of magnets, thereby moving the lens holding means to a predetermined position and selectively shifting one of the first and second lenses into the optical path of the light; and optical path altering means, disposed at one of a position between said light source and said separating means and a position between said separating means and said lens holding means, for shifting by a predetermined amount the light guided from the light source towards said selected one of said first and second lenses, with respect to an optical axis defined between the light source and said selected one of said first and second lenses, wherein, when said first lens is in said optical path, control of said tracking is performed using a first pair of said two pairs of coils and control of said focusing is performed using a second pair of said two pairs of coils, and, when said second lens is in said optical path, control of said tracking is performed using said second pair of said two pairs of coils and control of said focusing is performed using said first pair of said two pairs of coils.

17. An optical head unit according to claim 16, wherein said optical path altering means includes a parallel flat plate held on a holder having a curved surface, and said optical path altering means is moved in a predetermined direction by a necessary amount with said curved surface of the holder used as a center of the movement, such that said movement of the optical path altering means is at least one of rotational movement and inclining movement and a predetermined angle is defined between a surface of the parallel flat plate and the optical path of the light traveling toward the selected one of said first and second lenses.

18. An optical head unit according to claim 16, wherein said first and second lenses are coplanar.

19. An optical head unit according to claim 18, wherein said first and second lenses are arranged at right angles, as viewed in a direction perpendicular to a plane in which said first and second lenses are arranged.

20. An optical head unit according to claim 18, wherein the magnetic field generated by said other pair is adapted to move said first and second lenses in a direction perpendicular to a plane in which said first and second lenses are arranged.

21. An optical head unit according to claim 18, wherein the magnetic field generated by said one pair of said two pairs of magnets is adapted to rotate said first and second lenses about an axis perpendicular to a plane in which said first and second lenses are arranged.

22. An optical head unit according to claim 18, wherein said two pairs of coils are arranged such that changes in direction of current flow through said two pairs of coils cause changes in direction of rotation of said first and second lenses and changes in direction of translation of said first and second lenses along an axis of said rotation.

23. An optical head unit according to claim 16, said first and second lenses being movable about a central axis parallel to the optical axes of said first and second lenses, and said two pairs of coils being disposed about said central axis such that said first pair of said two pairs of coils face each other and said second pair of said two pairs of coils face each other.

* * * * *